US012479696B2

(12) United States Patent
Chen et al.

(10) Patent No.: US 12,479,696 B2
(45) Date of Patent: Nov. 25, 2025

(54) CALIBRATION METHOD AND SYSTEM FOR VIRTUAL BUTTONS, ELEVATOR AND STORAGE MEDIUM

(71) Applicant: Otis Elevator Company, Farmington, CT (US)

(72) Inventors: Qiang Chen, Shanghai (CN); Bichun Li, Shanghai (CN); Qirui Wang, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1050 days.

(21) Appl. No.: 17/524,009

(22) Filed: Nov. 11, 2021

(65) Prior Publication Data

US 2022/0281714 A1 Sep. 8, 2022

(30) Foreign Application Priority Data

Mar. 4, 2021 (CN) ........................ 202110239765.0

(51) Int. Cl.
*B66B 1/46* (2006.01)
*B66B 1/34* (2006.01)

(52) U.S. Cl.
CPC ............ *B66B 1/468* (2013.01); *B66B 1/3423* (2013.01); *B66B 2201/4638* (2013.01)

(58) Field of Classification Search
CPC .................. B66B 1/468; B66B 1/3423; B66B 2201/4638; B66B 1/461; G06F 3/0418; G06F 3/0425; G06F 3/04886; G06F 3/0488; G06F 3/0484
See application file for complete search history.

(56) References Cited

U.S. PATENT DOCUMENTS

| | | | | |
|---|---|---|---|---|
| 6,161,654 | A * | 12/2000 | Sirigu | B66B 3/00 187/391 |
| 7,823,701 | B2 * | 11/2010 | Roussel | B66B 5/0018 187/316 |
| 9,463,955 | B2 * | 10/2016 | Preston | B66B 3/002 |
| 10,303,744 | B2 * | 5/2019 | Muncy | G06F 3/04845 |
| 2014/0181722 | A1 | 6/2014 | Kim et al. | |
| 2015/0232300 | A1 | 8/2015 | Preston | |
| 2019/0284020 | A1 * | 9/2019 | Gireddy | B66B 1/468 |
| 2020/0307952 | A1 * | 10/2020 | Wei | H04W 4/33 |

FOREIGN PATENT DOCUMENTS

EP 3524558 A1 8/2015

OTHER PUBLICATIONS

European Search Report for Application No. 21210598.5, Issued May 9, 2022, 9 Pages.
European Search Report for Application No. 21210598.5, Issued Feb. 19, 2025, 8 Pages.

* cited by examiner

*Primary Examiner* — Hoang M Nguyen
(74) *Attorney, Agent, or Firm* — CANTOR COLBURN LLP

(57) ABSTRACT

A calibration method and system for virtual buttons, an elevator, and a storage medium. The method includes: receiving a first designation regarding a layout of the virtual buttons in a virtual keypad zone; receiving a second designation regarding a number of the virtual buttons; and determining a position of each of the virtual buttons in the virtual keypad zone according to the first designation and the second designation.

12 Claims, 9 Drawing Sheets

CALIBRATION METHOD AND SYSTEM FOR VIRTUAL BUTTONS, ELEVATOR AND STORAGE MEDIUM

FOREIGN PRIORITY

This application claims priority to Chinese Patent Application No. 202110239765.0, filed Mar. 4, 2021, and all the benefits accruing therefrom under 35 U.S.C. § 119, the contents of which in its entirety are herein incorporated by reference.

TECHNICAL FIELD

The present application relates to the field of elevator control, and more specifically, the present application relates to a calibration method for virtual buttons, a calibration system for virtual buttons, an elevator, and a storage medium.

BACKGROUND ART

As the novel coronavirus is raging around the world, environmental hygiene in public places has attracted widespread attention of people. For high-rise buildings, elevators are inevitable public places, and the hygiene in the use of elevators during the epidemic prevention period is the key work of the property management companies. However, the biochemical disinfection of elevators has a limitation of action time, so avoiding cross-infection in the use of elevators is a feasible research direction.

In the prior art, the call panel in the elevator car needs to be touched for clicking, so there is a risk of cross-infection. In view of this, the present invention proposes a mechanism for triggering call commands without touching the physical buttons of the call panel, and more specifically, proposes a calibration mechanism for the corresponding virtual buttons of these physical buttons.

SUMMARY

The embodiments of the present application provide a calibration method for virtual buttons, a calibration system for virtual buttons, an elevator, and a computer-readable storage medium, which are used to calibrate the virtual buttons, so as to facilitate subsequent identification of control operations on these buttons.

According to one aspect of the present application, a calibration method for virtual buttons is provided, which comprises: receiving a first designation regarding a layout of the virtual buttons in a virtual keypad zone; receiving a second designation regarding a number of the virtual buttons; and determining a position of each of the virtual buttons in the virtual keypad zone according to the first designation and the second designation.

In some embodiments of the present application, optionally, the virtual keypad zone comprises a rectangular keypad zone, and the first designation comprises a third designation for the layout of the virtual buttons in the rectangular keypad zone.

In some embodiments of the present application, optionally, the third designation comprises at least a designation for vertex virtual buttons in the rectangular keypad zone.

In some embodiments of the present application, optionally, the virtual keypad zone further comprises a derived keypad zone in addition to the rectangular keypad zone, and the first designation further comprises a fourth designation for the layout of the virtual buttons in the derived keypad zone.

In some embodiments of the present application, optionally, the fourth designation comprises a designation for each of the virtual buttons in the derived keypad zone.

In some embodiments of the present application, optionally, the second designation comprises a designation of two adjacent virtual buttons in any column of the virtual buttons and/or a designation of two adjacent virtual buttons in any row of the virtual buttons.

In some embodiments of the present application, optionally, the first designation is performed in accordance with the order of floor numbers.

In some embodiments of the present application, optionally, determining the position of each of the virtual buttons in the virtual keypad zone comprising: determining midpoints of the corresponding virtual buttons of the first designation according to the first designation; determining a midpoint of each of the virtual buttons according to the second designation; and estimating a position of each of the virtual buttons according to the midpoints of the virtual buttons.

According to another aspect of the present application, a calibration system for virtual buttons is provided, which comprises: a camera configured to collect depth images; a memory configured to store instructions; a processor configured to execute the instructions to perform the following operations: controlling the camera to receive a first designation regarding a layout of the virtual buttons in a virtual keypad zone; controlling the camera to receive a second designation regarding a number of the virtual buttons in the virtual keypad zone; and determining a position of each of the virtual buttons in the virtual keypad zone according to the first designation and the second designation.

According to another aspect of the present application, a calibration system for virtual buttons is provided, which comprises: a camera configured to collect depth images; an input port configured for inputting information; a memory configured to store instructions; a processor configured to execute the instructions to perform the following operations: controlling the camera to receive a first designation regarding a layout of the virtual buttons in a virtual keypad zone; controlling the input port to receive a second designation regarding a number of the virtual buttons in the virtual keypad zone; and determining a position of each of the virtual buttons in the virtual keypad zone according to the first designation and the second designation.

According to another aspect of the present application, a computer-readable storage medium is provided, which stores instructions therein. Wherein, the instructions, when executed by a processor, cause the processor to execute any of the method as described above.

According to another aspect of the present application, an elevator is provided, which comprises any of the storage medium as described above or any of the calibration system for virtual buttons as described above.

According to another aspect of the present application, an elevator is provided, which comprises virtual buttons, wherein the virtual buttons are calibrated in accordance with any of the calibration method for virtual buttons as described above, or any of the calibration system for virtual buttons as described above.

In some embodiments of the present application, optionally, the elevator further comprises a camera collecting depth images, which is configured to collect user's operations of the virtual buttons.

BRIEF DESCRIPTION OF THE DRAWINGS

The above and other objects and advantages of the present application will become more fully apparent from the following detailed description in conjunction with the accompanying drawings in which like numbers represent like or similar characters.

DETAILED DESCRIPTION

For the sake of brevity and illustrative purposes, the principles of the present application have been described herein mainly with reference to exemplary embodiments thereof. However, those skilled in the art will readily recognize that the same principles may be equivalently applied to all types of virtual button calibration methods, virtual button calibration systems, elevators, and computer-readable storage media, and that these same or similar principles may be implemented therein. Any type of such modifications does not depart from the true spirit and scope of the present application.

Figure 7:
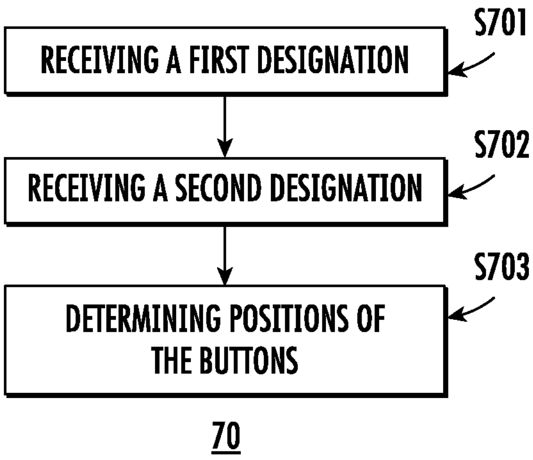
FIG. 7 shows a virtual button calibration method according to one embodiment of the present application.

According to one aspect of the present application, a virtual button calibration method is provided. As shown in FIG. 7, the virtual button calibration method 70 includes the following steps: in step S701, a first designation regarding the layout of the virtual buttons in the virtual keypad zone is received. In step S702, a second designation regarding the number of virtual buttons is received. In step S703, the position of each virtual button in the virtual keypad zone is determined according to the first designation and the second designation. It should be noted that although the sequence of step S701 and step S702 is shown in the figure, this is only illustrative. In some examples, the steps of S702 and S701 may be reversed. In other examples, the two steps may actually be triggered by a specific action, operation, data, or signal, and both of them are performed simultaneously.

Figure 1:
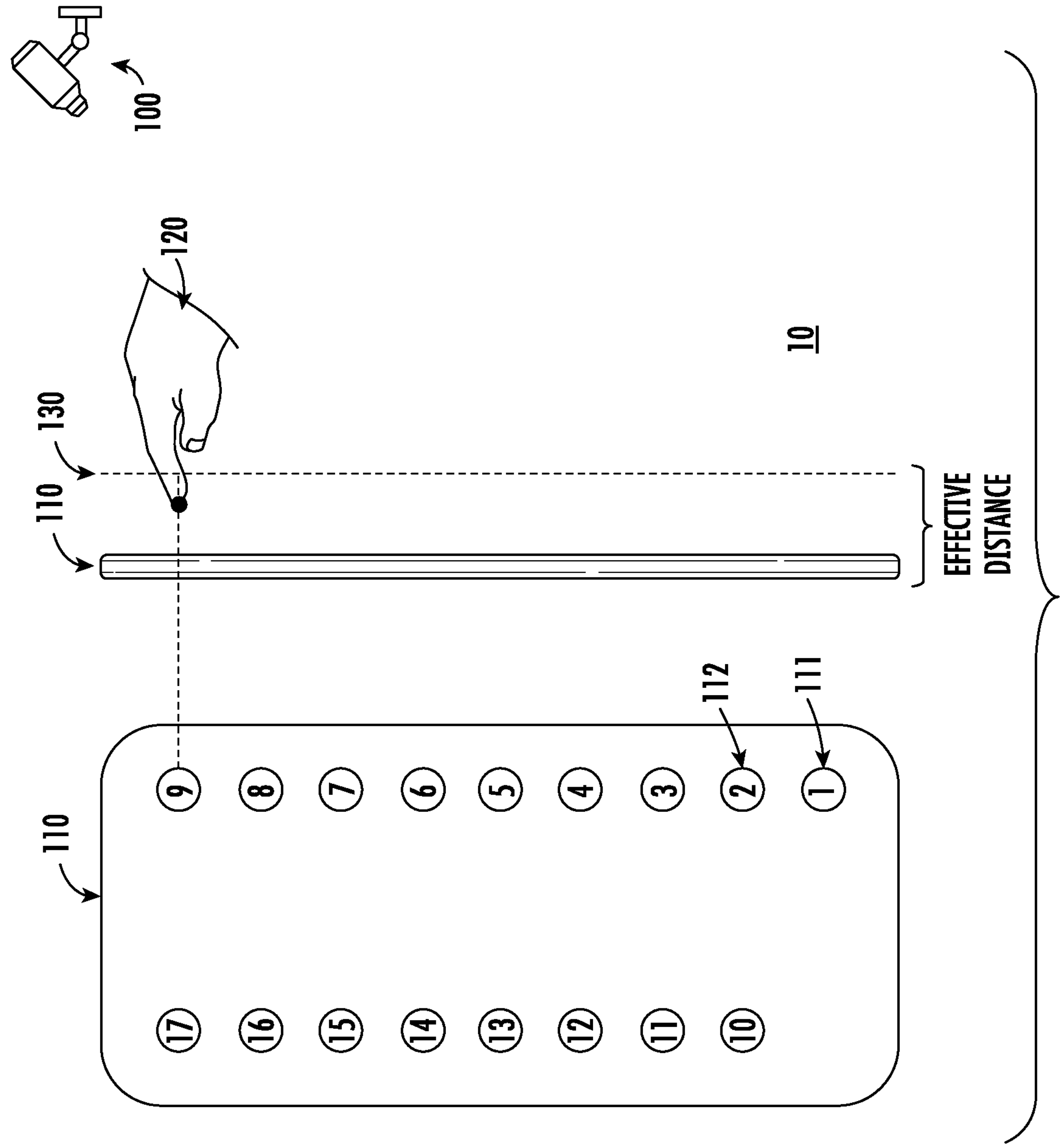
FIG. 1 shows the principle of the virtual button calibration according to one embodiment of the present application.

As shown in FIG. 1, a physical keypad zone 110 is shown in the virtual button calibration system 10. For example, it may be implemented as a call panel of an elevator car. In the prior art, in order to reach the floor "9" through a call operation, the user can use the finger 120 to press the physical button "9" in the physical keypad zone 110. Subsequently, this call instruction including the target floor "9" will be sent to the elevator control system, and then the control system controls the elevator to run to the target floor. Each button on the physical keypad zone 110 includes a physical button 111 and an indicator 112 (for example, it may be a mark engraved on the surface of the physical buttons 111 using laser technology) that identifies the object floor of the physical buttons 111. In some examples, the physical buttons 111 also includes a light-emitting mark, which may appear after receiving a feedback signal from the control system. For example, the light-emitting mark of the physical button "9" in FIG. 1 is in a lighted state, which indicates that the control system has responded to the user's call operation.

In order to achieve a contactless call, some examples of the present invention draw up a virtual keypad zone based on the physical keypad zone 110, and the layout of the virtual keypad zone may be consistent with the physical keypad zone 110. Specifically, each of the physical buttons 111 in the physical keypad zone 110 has a corresponding virtual button in the virtual keypad zone, and the size of the virtual buttons and the distance between the virtual buttons can be the same as the size of the physical buttons 111 and the distance between the physical buttons 111.

In some examples, the virtual keypad zone may be drawn up at a place at a certain distance in front of the physical keypad zone 110. For example, it may be drawn up as a plane at a certain distance from the physical keypad zone 110. In FIG. 1, a virtual keypad zone is drawn up on the plane 130, and the area of the virtual keypad zone may be similar to that of the physical keypad zone 110. The present invention does not limit the size and area of the virtual keypad zone, but focuses on the drawing up of virtual buttons in the virtual keypad zone, or in other words, focuses on determining the position of each virtual button. The drawing up of the virtual keypad zone may be used as an intermediate link or a mathematical assumption without actual existence.

Further, the position of each virtual button in the virtual keypad zone can be determined according to the virtual button calibration method 70. After the calibration to be completed, when the user's finger 120 is within the effective distance from the physical keypad zone 110, the call operation can be achieved by clicking the virtual button with the finger 120.

After performing the calibration task, the virtual button calibration system 10 can also serve as the elevator call system or part of the functional entities of the call system. The positions of the virtual buttons (for example, coordinates information) will be stored in the call system, and the call system captures the spatial coordinates of the finger 120 through the camera 100. When the coordinates of the finger 120 overlap with the position of a virtual button to a certain extent (the finger 120 used for triggering is within the effective distance from the physical keypad zone 110 at this time), it can be determined that the finger 120 has executed the clicking of the virtual button. Generally speaking, the effective range of clicking may be no greater than the effective distance shown in the figure.

According to one example of the present invention, the virtual button calibration method 70 receives a first designation regarding the layout of the virtual buttons in the virtual keypad zone in step S701. The layout of the virtual buttons refers to the arrangement pattern of the virtual buttons in the virtual keypad zone. For example, the virtual buttons are arranged in a single column as a bar, a rectangle, or a rectangle with a number of scattered buttons outside. In some examples, the layout of these virtual buttons is consistent with the layout of physical buttons. In other examples, there may be no physical buttons, but symbols with button marks are used to replace physical buttons. In this situation, the layout of these virtual buttons is consistent with these symbols.

Figure 2:
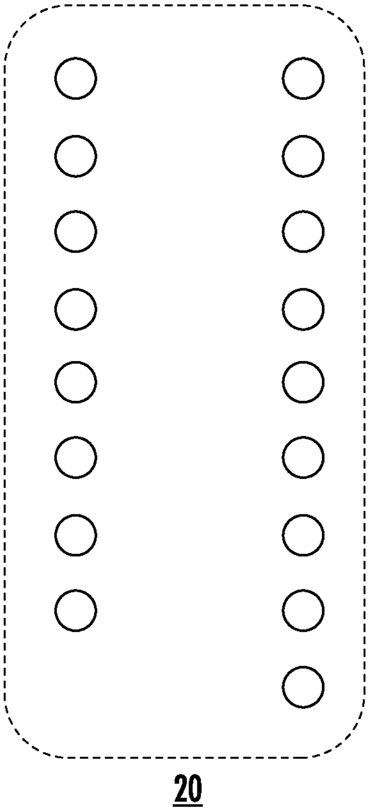
FIG. 2 shows the principle of the virtual button calibration according to one embodiment of the present application.

The layout of the virtual buttons may be actively acquired via such as the camera 100 of the virtual button calibration system 10. As shown in FIG. 2, the camera 100 can obtain depth image 20 of the physical buttons and obtain the edge information of the physical buttons, and then calculate the layout and the number of the physical buttons in the physical keypad zone. On this basis, the layout of the virtual buttons can be consistent with the layout of the physical buttons, which is equivalent to obtaining the layout of the virtual buttons through the camera 100. In addition, this method also obtains the number of virtual buttons (which can be the same as the number of physical buttons) simultaneously.

The "designation(s)" in the examples of the present invention refers to a manner for information distribution, in which the prefixing "first", "second", and the like are only used to distinguish these "designations", and do not represent the precedence relationship between these "designations".

In a typical example, the user may use the finger 120 to click these physical buttons 111 one by one in a virtual manner at a certain distance above the physical buttons 111 (for example, at the effective distance shown in the figure). In the context of the present invention, it is conceivable that there is one virtual button corresponding to the physical button 111 at a certain distance above the physical button 111. Alternatively, such as a transparent acrylic panel can be used to assist the calibration of the finger 120 and the thickness of the acrylic panel can be equal to the effective distance shown in the figure. The finger 120 can directly click on the acrylic panel to simulate the virtual buttons.

The camera 100 can capture the coordinates of each contacting point of the finger 120, and form a designation of the layout of the virtual buttons according to these contacting points. This manner needs to click on each virtual button one by one, which is time-consuming. It should be noted that the first designation regarding the layout of the virtual buttons in the virtual keypad zone includes (or can be used to calculate) coordinates information of the virtual keypad zone.

Figure 6:
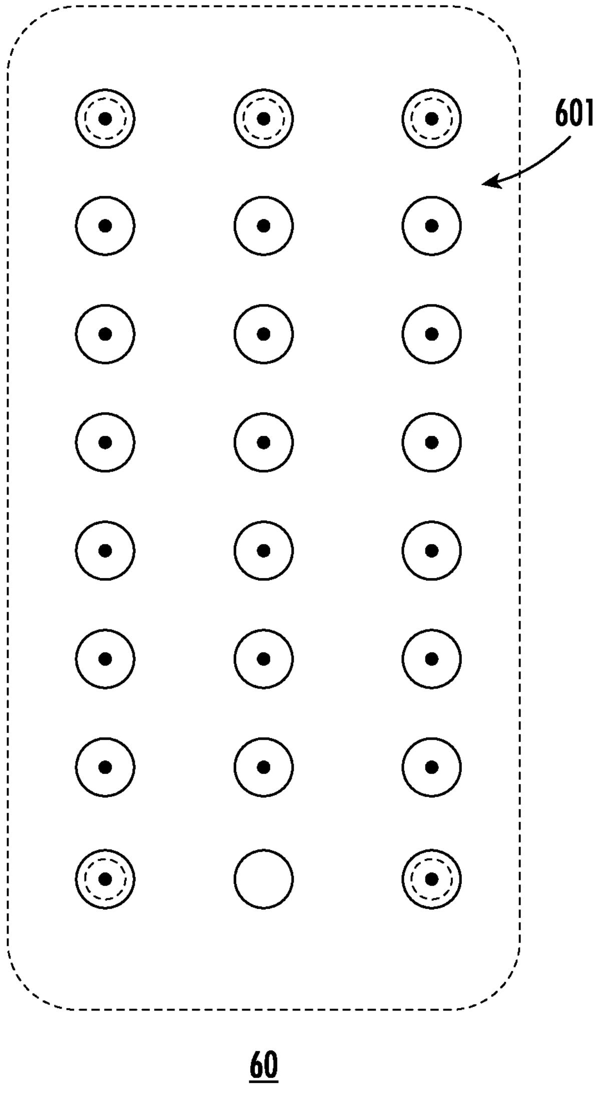
FIG. 6 shows the principle of the virtual button calibration according to one embodiment of the present application.

In some embodiments of the present application, the virtual keypad zone includes a regular rectangular keypad zone, and the first designation includes a third designation for the layout of the virtual buttons in the rectangular keypad zone. Generally speaking, the button layout of the call panel is regular. For buttons with multiple rows, there will be a rectangular shaped keypad zone. FIG. 6 shows a feasible virtual keypad zone 601 corresponding to the physical keypad zone. In the illustrated layout condition 60, the three columns of buttons form a regular rectangular shape, that is, the virtual keypad zone 601 consists of only regular rectangular keypad zone. In this situation, the third designation for the layout of the virtual buttons in the rectangular keypad zone is the first designation for the layout of the virtual buttons in the entire virtual keypad zone.

Figure 5:
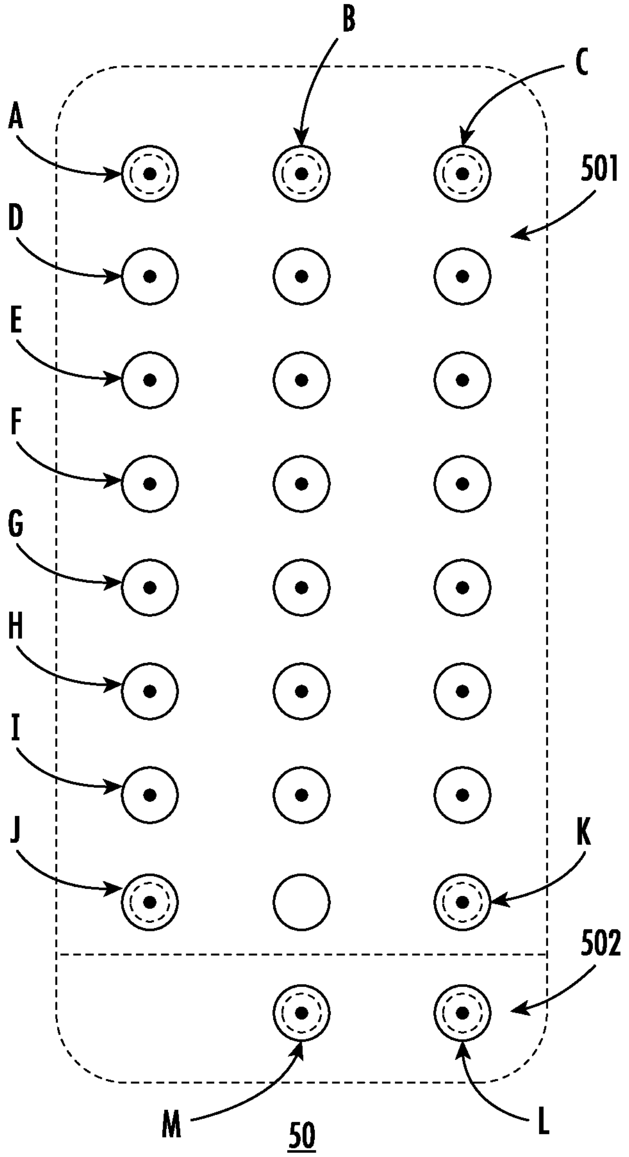
FIG. 5 shows the principle of the virtual button calibration according to one embodiment of the present application.

FIG. 5 shows another virtual keypad zone corresponding to the physical keypad zone. The illustrated layout condition 50 includes a virtual keypad zone 501 and a virtual keypad zone 502. Among them, the virtual keypad zone 501 is a regular rectangular keypad zone. In this situation, the third designation for the layout of the virtual buttons in the rectangular keypad zone can only partially represent the first designation.

For the regular rectangular keypad zone, we may not need to click each virtual button thereof. For example, in some embodiments of the present application, the third designation may be the designation of the vertex virtual button in the rectangular keypad zone. In addition, the third designation may also include the designation of some non-vertex buttons in the rectangular keypad zone, but this is not necessary. Through the designation of the vertex virtual button in the third designation, such as the virtual button calibration system 10 may receive a part of the designation regarding the layout of the virtual buttons in the virtual keypad zone. As shown in FIG. 5, the four vertex buttons (illustrated as including a circular dashed line) in the virtual keypad zone 501 are used to form a third indication.

In some embodiments of the present application, the virtual keypad zone further includes a derived keypad zone in addition to the rectangular keypad zone, and the first designation further includes a fourth designation for the layout of the virtual buttons in the derived keypad zone. As shown in FIG. 5, the virtual keypad zone 502 is a derived keypad zone in addition to the rectangular keypad zone. In order to completely obtain the layout of the virtual buttons in the virtual keypad zone, it is also required to receive a designation (the fourth designation) regarding the layout of the virtual buttons in this part of virtual keypad zone. In this case, the first designation includes the third designation and the fourth designation.

In some embodiments of the present application, the fourth designation includes the designation of each virtual button in the derived keypad zone. As descried above, the designation of the layout of the virtual buttons in the rectangular virtual keypad zone can be achieved through the designation of the vertex virtual buttons, but the number of buttons in the derived keypad zone is generally small, so the designation of the layout of the virtual buttons in the derived keypad zone can be achieved through the designation of each virtual button thereof.

According to one example of the present invention, the virtual button calibration method 70 receives a second designation regarding the number of virtual buttons in step S702. In some examples, the second designation can be achieved through directly inputting the number of virtual buttons. For example, as shown in FIG. 6, the number of virtual buttons can be directly designated as 24 in this situation. Further, as shown in FIG. 5, the number of virtual buttons can be directly designated as 26 in this situation.

In some embodiments of the present application, the second designation is not directly given, but can be calculated through the designation of two adjacent virtual buttons. In this situation, the second designation may include a designation of two adjacent virtual buttons in any column of virtual buttons and/or a designation of two adjacent virtual buttons in any row of virtual buttons. Since the space between rows and columns of virtual buttons is fixed, the space between all adjacent virtual buttons in rows can be estimated according to the designation of two adjacent virtual buttons in any column of virtual buttons, and the space between all adjacent virtual buttons in columns can be estimated according to the designation of two adjacent virtual buttons in any row of virtual buttons. In some examples, only two adjacent virtual buttons in any column of virtual buttons or two adjacent virtual buttons in any row of virtual buttons may be designated. If only two adjacent virtual buttons in any column of virtual buttons or two adjacent virtual buttons in any row of virtual buttons are designated, the space between two adjacent virtual buttons in any column of virtual buttons is considered to be equal to the space between two adjacent virtual buttons in any row of virtual buttons, and the calculation can be based on this.

According to one example of the present invention, the virtual button calibration method 70 determines a position of each virtual button in the virtual keypad zone according to the first designation and the second designation in step S703. After knowing the layout and the number of the virtual buttons in the virtual keypad zone, the position of the virtual buttons in the entire virtual keypad zone can be estimated.

As shown in FIG. 5, the virtual buttons J, A, K, and C used for the third designation for the layout of the virtual buttons in the rectangular keypad zone are shown, and the virtual buttons M and L used for the fourth designation for the layout of the virtual buttons in the derived keypad zone are shown. In addition, the virtual buttons K and L indicate the designation of adjacent virtual buttons in rows (as described above, it can be used to estimate the spaces between all adjacent virtual buttons in rows), and the virtual buttons M and L indicate the designation of adjacent virtual buttons in columns (as described above, it can be used to estimate the spaces between all adjacent virtual buttons in columns). In this situation, the coordinates of the virtual button B can be estimated according to the coordinates of the virtual buttons A and C (included in the first designation) and the spaces between adjacent virtual buttons in columns first. The coordinates of the virtual buttons D, E, F, G, H, and I can also be estimated according to the coordinates of the virtual buttons A and J and the spaces between adjacent virtual buttons in rows. The positions of the remaining virtual buttons can be estimated according to the method described above.

In some embodiments of the present application, the first designation may be performed in accordance with an order of floor numbers. As shown in FIG. 5, the floors represented by the virtual buttons in the figure represent floor "1" to floor "26" in the order from left to right and from bottom to top. In order to form the first designation, the user can use the finger 120 to designate the position of the virtual buttons J (representing floor "1"), A (representing floor "8"), M (representing floor "9"), L (representing floor "18"), K (representing floor "19") and C (representing floor "26") in order. In this way, such as the virtual button calibration system 10 will not only know the position of each button, but also know the floor order corresponding to the button.

Figure 8:
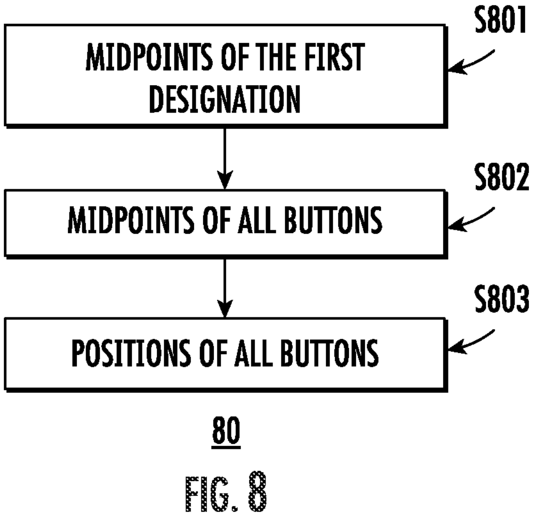
FIG. 8 shows a virtual button calibration method according to one embodiment of the present application.

In some embodiments of the present application, determining the position of each virtual button in the virtual keypad zone in step S703 may also specifically include the following steps. As shown in FIG. 8, the process 80 of determining the position of each virtual button in the virtual keypad zone includes: determining midpoints of the corresponding virtual buttons of the first designation according to the first designation in step S801, determining a midpoint of each virtual button according to the second designation in step S802, and estimating a position of each virtual button according to the midpoints of the virtual buttons in step S803.

Figure 3:
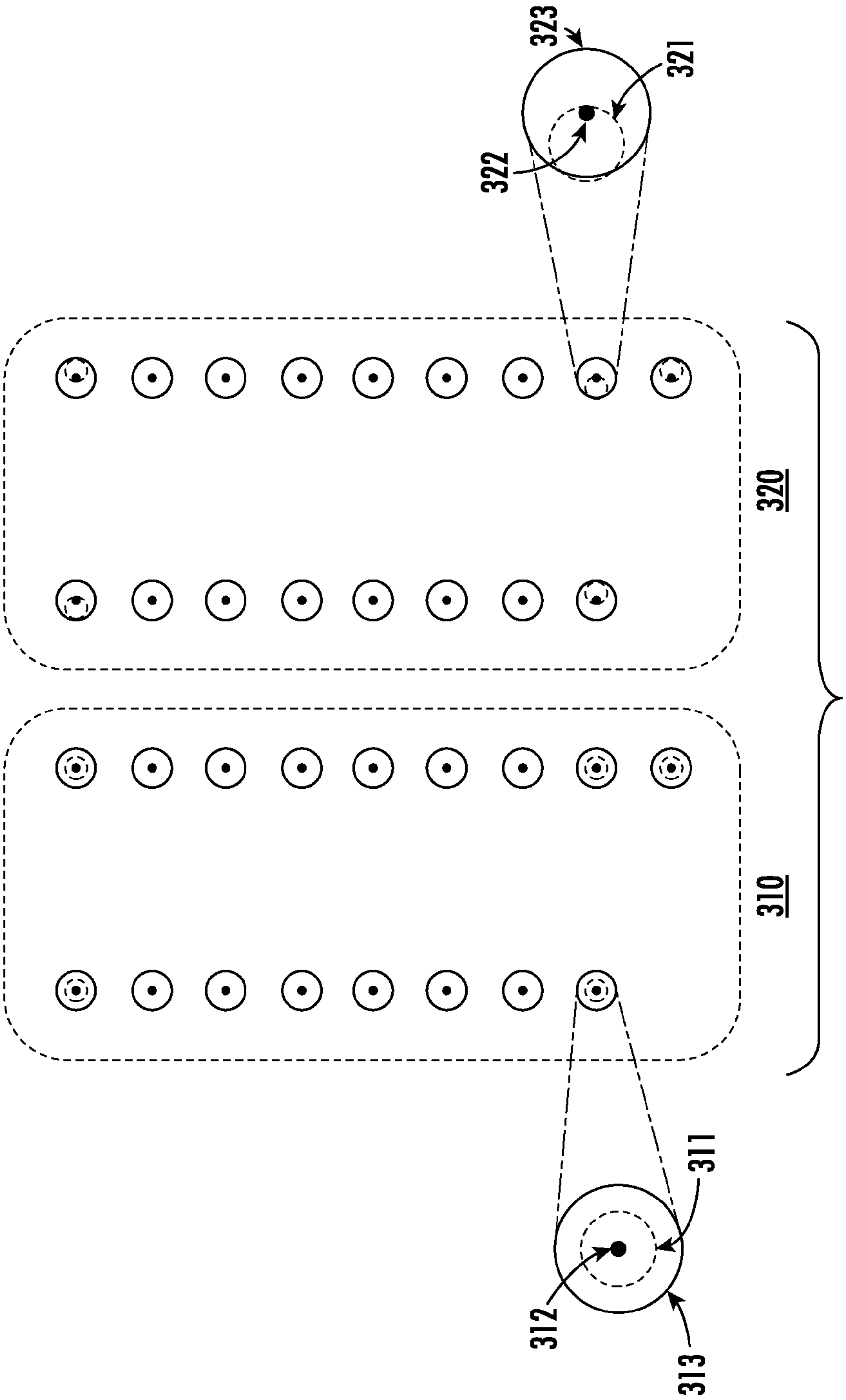
FIG. 3 shows the principle of the virtual button calibration according to one embodiment of the present application.

The process 80 determines the midpoints of the corresponding virtual buttons of the first designation according to the first designation in step S801. As shown in FIG. 3, the virtual keypad zone 310 on the left represents a calibration state under ideal conditions, and the virtual keypad zone 320 on the right represents a calibration state under actual conditions.

The virtual button 313 illustrated in the virtual keypad zone 310 is its actual position to be determined. In the ideal calibration process, the finger 120 can always leave an ideal circular mark 311 in the virtual keypad zone 310, and the ideal circle center of the mark 311 can be derived from this, which is also the midpoint 312 of the virtual button 313. However, this condition is rare in the actual calibration process.

Figure 4:
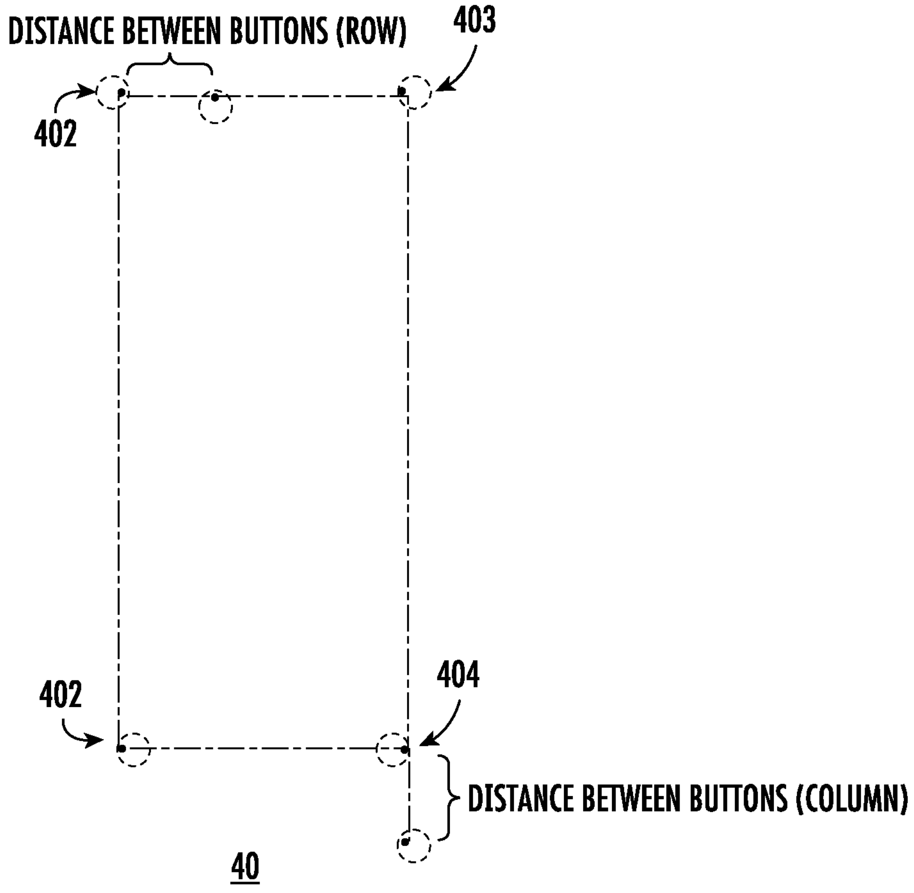
FIG. 4 shows the principle of the virtual button calibration according to one embodiment of the present application.

The virtual button 323 illustrated in the virtual keypad zone 320 is its actual position to be determined. In the actual calibration process, the finger 120 leaves an actual mark 321 in the virtual keypad zone 320 (although shown as a circle in the figure for illustrative purposes, it may be other irregular shapes). In some examples, the midpoint 322 of the virtual button 323 needs to be estimated from the mark 321. FIG. 4 shows a feasible estimation method.

As shown in FIG. 4, in the actual calibration process, the finger 120 leaves marks 401-404 in the virtual keypad zone as the designation of the vertex virtual buttons in the rectangular keypad zone. In this situation, the midpoint of each vertex virtual button can be estimated from the marks 401-404. As shown in the figure, the process of estimating the midpoint of each vertex virtual button can be performed simultaneously with the third designation for the layout of the virtual buttons in the rectangular keypad zone. For example, the rectangle determined by the estimated midpoints can cover these marks as much as possible (the three-dimensional problem is simplified to expand the discussion in the two-dimensional virtual keypad zone for illustrative purposes in the figure). The corresponding layout condition 40 of the first designation can be obtained according to step S801.

The process 80 determines the midpoint of each virtual button according to the second designation in step S802. Continuing to refer to FIG. 4, the midpoint of each virtual button can be estimated according to the midpoints of the corresponding virtual buttons of the third designation and the spaces between adjacent virtual buttons in rows/columns (which are regarded as equal to the spaces between the midpoints of adjacent virtual buttons in rows/columns) with reference to the process described above. In step S802, it may also minimize the sum of squares of the distances from each estimated midpoint to the nearest rectangle side, iteratively optimize the result of step S801 based on this, and finally form stable midpoints and the rectangle.

The process 80 estimates the position of each virtual button according to the midpoints of the virtual buttons in step S803. After determining the midpoint of each virtual button, the radius of the circular virtual buttons can be drawn up, and the position of each virtual button can be estimated accordingly. It should be noted that the radius of the virtual button may be different from the radius of the corresponding physical button or button mark. For example, in order to reduce the difficulty of clicking, the radius of the virtual button can be set larger than the radius of the corresponding physical button or button mark. For another example, in order to improve the accuracy of clicking, the radius of the virtual button can be set to be smaller than the radius of the corresponding physical button or button mark.

Figure 9:
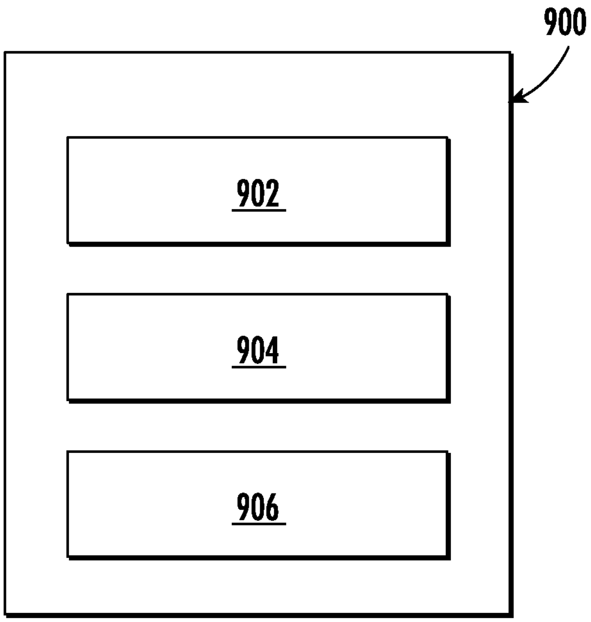
FIG. 9 shows a virtual button calibration system according to one embodiment of the present application.

According to another aspect of the present application, a virtual button calibration system is provided. As shown in FIG. 9, the virtual button calibration system 900 includes a camera 902, a memory 904, and a processor 906. Among them, the camera 902 is configured to collect depth images. The memory 904 is configured to store instructions. The processor 906 is configured to execute the instructions stored in the memory 904 to achieve the following operations: controlling the camera 902 to receive a first designation regarding a layout of the virtual buttons in a virtual keypad zone; controlling the camera 902 to receive a second designation regarding a number of the virtual buttons in the virtual keypad zone; and determining a position of each virtual button in the virtual keypad zone according to the first designation and the second designation.

The process in which the processor 906 controls the camera 902 to receive the first designation regarding the layout of the virtual buttons in the virtual keypad zone can be performed according to the step of receiving the first designation in the virtual button calibration method described above, and the relevant content is also cited herein. In this situation, the camera 902 will be used as an image acquisition device, and for the sake of brevity, the description is not repeated here.

The process in which the processor 906 controls the camera 902 to receive the second designation regarding the number of the virtual buttons in the virtual keypad zone can be performed according to the step of receiving the second designation in the virtual button calibration method described above, and the relevant content is also cited herein. In this situation, the camera 902 will be used as an image acquisition device, and for the sake of brevity, the description is not repeated here.

The process in which the processor 906 determines the position of each virtual button in the virtual keypad zone according to the first designation and the second designation can be performed according to the step of determining the position of each virtual button in the virtual button calibration method described above, and the relevant content is also cited herein. For the sake of brevity, the description is not repeated here.

Figure 10:
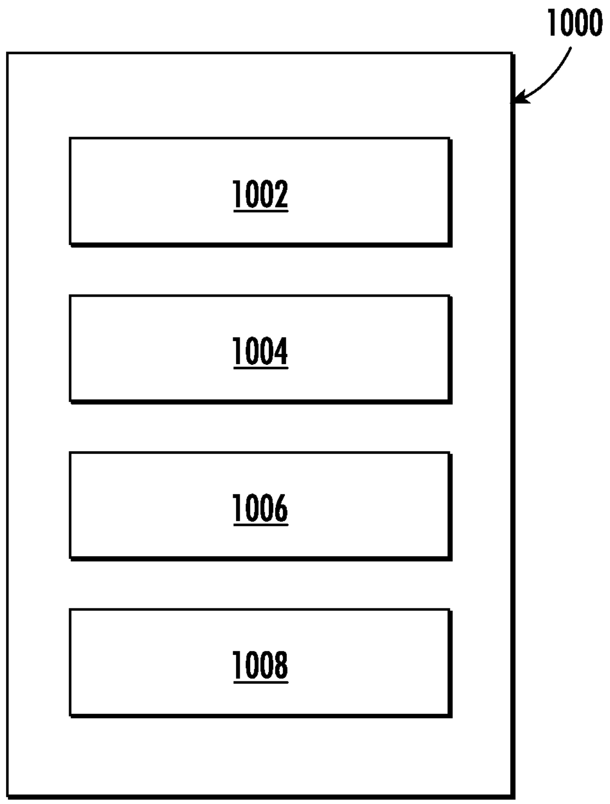
FIG. 10 shows a virtual button calibration system according to one embodiment of the present application.

According to another aspect of the present application, a virtual button calibration system is provided. As shown in FIG. 10, the virtual button calibration system 1000 includes a camera 1002, an input port 1004, a memory 1006, and a processor 1008. Among them, the camera 1002 is configured to collect depth images. The input port 1004 is configured for inputting information. The memory 1006 is configured to store instructions. The processor 1008 is configured to execute the instructions stored in the memory 1006 to achieve the following operations: controlling the camera 1002 to receive a first designation regarding a layout of the virtual buttons in a virtual keypad zone; controlling the input port 1004 to receive a second designation regarding a number of the virtual buttons in the virtual keypad zone; and determining a position of each virtual button in the virtual keypad zone according to the first designation and the second designation.

The process in which the processor 1006 controls the camera 1002 to receive the first designation regarding the layout of the virtual buttons in the virtual keypad zone can be performed according to the step of receiving the first designation in the virtual button calibration method described above, and the relevant content is also cited herein. In this situation, the camera 1002 will be used as an image acquisition device, and for the sake of brevity, the description is not repeated here.

The process in which the processor 1006 controls the input port 1004 to receive the second designation regarding the number of the virtual buttons in the virtual keypad zone can be performed according to the step of receiving the second designation in the virtual button calibration method described above, and the relevant content is also cited herein. In this situation, the input port 1004 will be used as a data/information input device, and for the sake of brevity, the description is not repeated here.

The process in which the processor 1006 determines the position of each virtual button in the virtual keypad zone according to the first designation and the second designation can be performed according to the step of determining the position of each virtual button in the virtual button calibration method described above, and the relevant content is also cited herein. For the sake of brevity, the description is not repeated here.

According to another aspect of the present application, a computer-readable storage medium is provided, which stores instructions therein. The instructions, when executed by a processor, cause the processor to execute any virtual button calibration method as described above. The computer-readable media according to the present application comprise all types of computer storage media, and may be any available media that can be accessed by a general-purpose or special-purpose computer. By way of example, computer-readable media may comprise RAM, ROM, EPROM, $E^2$PROM, register, hard disk, removable disk, CD-ROM, or other optical disk storage, magnetic disk storage, or other magnetic storage device, or any other transitory or non-transitory medium that can be used to carry or store desired program code units in the form of instructions or data structures and that can be accessed by a general-purpose or special-purpose computer, or a general-purpose or special-purpose processor. As used herein, disks usually reproduce data magnetically, while discs use lasers to reproduce data optically. The combinations discussed above should also be comprised within the claimed scope of the computer-readable medium. An exemplary storage medium is coupled to a processor to enable the processor reading information from/writing information to the storage medium. In the alternative scheme, the storage medium may be integral to the processor. The processor and the storage medium may reside in an ASIC. The ASIC may reside in a user terminal. In the alternative scheme, the processor and storage medium may reside in a user terminal as discrete components.

According to another aspect of the present application, an elevator is provided, which includes any storage medium as described above or any virtual button calibration system as described above. After completing the calibration task, the virtual button calibration system can also serve as the elevator call system or part of the functional entities of the call system. After completing the calibration task, the storage medium can serve as the storage medium of the elevator call system or part of the functional entities of the call system.

According to another aspect of the present application, an elevator is provided, which includes virtual buttons, wherein the virtual buttons are calibrated in accordance with any virtual button calibration method as described above, or any virtual button calibration system as described above. In some embodiments of the present application, the elevator further includes a camera collecting depth images, which is configured to collect user's operations of the virtual button.

The above is merely the specific embodiment of the present application, but the claimed scope of the present application is not limited thereto. Those skilled in the art may envision other available variations or substitutions according to the scope of the technology disclosed by the present application that are encompassed within the claimed scope of the present application. The implementations of the present application and the features of the implementations may also be combined with each other without conflict. The claimed scope of the present application is determined by reference to the appended claims.

What is claimed is:

1. A calibration method for virtual buttons, comprising:

receiving a first designation regarding a layout of the virtual buttons in a virtual keypad zone;

receiving a second designation regarding a number of the virtual buttons, wherein the second designation comprises a designation of two adjacent virtual buttons in any column of the virtual buttons and/or a designation of two adjacent virtual buttons in any row of the virtual buttons; and determining a position of each of the virtual buttons in the virtual keypad zone according to the first designation and the second designation.

2. The method of claim 1, wherein the virtual keypad zone comprising a rectangular keypad zone, and the first designation comprising a third designation for the layout of the virtual buttons in the rectangular keypad zone.

3. The method of claim 2, wherein the third designation comprising at least a designation for vertex virtual buttons in the rectangular keypad zone.

4. The method of claim 2, wherein the virtual keypad zone further comprising a derived keypad zone in addition to the rectangular keypad zone, and the first designation further comprising a fourth designation for the layout of the virtual buttons in the derived keypad zone.

5. The method of claim 4, wherein the fourth designation comprising a designation for each of the virtual buttons in the derived keypad zone.

6. The method of claim 1, wherein the first designation is performed in accordance with the order of floor numbers.

7. The method of claim 1, wherein determining the position of each of the virtual buttons in the virtual keypad zone comprising:

determining midpoints of the corresponding virtual buttons of the first designation according to the first designation;

determining a midpoint of each of the virtual buttons according to the second designation; and estimating a position of each of the virtual buttons according to the midpoints of the virtual buttons.

8. A computer-readable storage medium having instructions stored therein, wherein the instructions, when executed by a processor, cause the processor to execute the method of claim 1.

9. A calibration system for virtual buttons, comprising:

a camera configured to collect depth images;

a memory configured to store instructions;

a processor configured to execute the instructions to perform the following operations:

controlling the camera to receive a first designation regarding a layout of the virtual buttons in a virtual keypad zone;

controlling the camera to receive a second designation regarding a number of the virtual buttons in the virtual keypad zone, wherein the second designation comprises a designation of two adjacent virtual buttons in any column of the virtual buttons and/or a designation of two adjacent virtual buttons in any row of the virtual buttons; and determining a position of each of the virtual buttons in the virtual keypad zone according to the first designation and the second designation.

10. An elevator comprising: the computer-readable storage medium of claim 8.

11. An elevator comprising virtual buttons, wherein the virtual buttons are calibrated in accordance with the calibration method for virtual buttons of claim 1.

12. The elevator of claim 11, further comprising a camera collecting depth images, which is configured to collect user's operations of the virtual buttons.

* * * * *